(12) United States Patent
Arthur et al.

(10) Patent No.: US 12,643,173 B2
(45) Date of Patent: Jun. 2, 2026

(54) AUTOMATED MARKING SYSTEMS AND METHODS FOR REPLACEABLE AUTOMATED MACHINE COMPONENT TRACKING

(71) Applicant: Toyota Motor Engineering & Manufacturing North America, Inc., Plano, TX (US)

(72) Inventors: John D. Arthur, Georgetown, KY (US); Terry A. Lee, Shelbyville, KY (US); James D. Womack, Lexington, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1242 days.

(21) Appl. No.: 17/391,362

(22) Filed: Aug. 2, 2021

(65) Prior Publication Data

US 2023/0033506 A1     Feb. 2, 2023

(51) Int. Cl.
| | |
|---|---|
| *B23K 11/30* | (2006.01) |
| *B23K 11/11* | (2006.01) |
| *B23K 11/31* | (2006.01) |
| *B23K 11/36* | (2006.01) |

(52) U.S. Cl.
CPC ......... *B23K 11/3072* (2013.01); *B23K 11/115* (2013.01); *B23K 11/312* (2013.01); *B23K 11/315* (2013.01); *B23K 11/36* (2013.01)

(58) Field of Classification Search
CPC . B23K 11/115; B23K 11/3072; B23K 11/312; B23K 11/315; B23K 11/36
USPC .......................................................... 219/91.2
See application file for complete search history.

(56) References Cited

U.S. PATENT DOCUMENTS

| | | | | |
|---|---|---|---|---|
| 3,162,958 | A * | 12/1964 | Miehls ..................... | B25D 5/00 |
| | | | | 33/676 |
| 5,734,141 | A * | 3/1998 | Voilmy .............. | B23K 11/3072 |
| | | | | 219/86.25 |
| 8,350,179 | B2 | 1/2013 | Schroth et al. | |
| 10,105,786 | B2 * | 10/2018 | Haeufgloeckner ......................... | |
| | | | | B23K 11/3063 |
| 10,226,833 | B2 * | 3/2019 | Teragaito .............. | B23K 11/311 |
| 2011/0188952 | A1 * | 8/2011 | Sigler ....................... | B23B 5/36 |
| | | | | 408/72 R |

FOREIGN PATENT DOCUMENTS

| | | |
|---|---|---|
| CN | 104416278 B | 3/2015 |
| CN | 212286262 U | 1/2021 |
| KR | 1435268 B1 | 8/2014 |

* cited by examiner

*Primary Examiner* — Chris Q Liu
*Assistant Examiner* — James F Sims, III
(74) *Attorney, Agent, or Firm* — Dinsmore & Shohl LLP

(57) ABSTRACT

An automated marking system for replaceable component tracking includes a robotic arm and a marking tool that is configured to place a distinguishing mark on a replaceable component of the robotic arm. A control system includes logic saved in memory that causes the robotic arm to move the replaceable component to the marking tool to place the distinguishing mark on the replaceable component.

11 Claims, 4 Drawing Sheets

MARK TIP — 102

MARK TIP — 104

REMOVE TIP — 106

REMOVE TIP — 108

DROP TIPS — 110

MOVE BY SENSOR — 112

LOAD TIPS — 114

HIT SENSOR — 116

ID TIP — 118

AUTOMATED MARKING SYSTEMS AND METHODS FOR REPLACEABLE AUTOMATED MACHINE COMPONENT TRACKING

TECHNICAL FIELD

The present specification generally relates to automated marking systems and methods, and more specifically, automated marking systems and methods for marking replaceable automated machine components for component tracking.

BACKGROUND

A number of automated machines (industrial robots) are available for various assembly functions within automobile assembly lines. As an example, automated machines may be used for picking target objects, for example, from a bin or other location and placing the objects at a different, preselected location. As another example, automated machines may be used for welding, such as resistance spot welding. In resistance spot welding, an electrode tip is used to convey an electrical current through a pair of weld pieces. Pressure and heat are used to fuse the weld pieces together.

Over a number of uses, the electrode tips may need to be replaced. Typically, the electrode tips are deposited in a bin and then inspected. It can be difficult to trace the electrode tips back to the automated machine with which they were used.

Accordingly, a need exists for automated marking systems and methods for replaceable automated machine component tracking.

SUMMARY

In one embodiment, an automated marking system for replaceable component tracking includes a robotic arm and a marking tool that is configured to place a distinguishing mark on a replaceable component of the robotic arm. A control system includes logic saved in memory that causes the robotic arm to move the replaceable component to the marking tool to place the distinguishing mark on the replaceable component.

In another embodiment, a method of automatically marking a removable component of a robotic arm for tracking the removable component back to the robotic arm is provided. The method includes the robotic arm moving the removable component to a marking tool and contacting the removable component against the marking tool providing a distinguishing mark. The robotic arm using an extraction tool to remove the removable component after providing the distinguishing mark.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to automated marking systems and methods for replaceable automated machine component tracking. The automated marking systems include an automated machine that includes a robotic arm with a replaceable automated machine component. In embodiments described herein, the automated machine may be a robotic welding machine and the replaceable component may be an electrode tip. The automated marking systems and methods further include a marking tool that is used to place a distinguishing mark on the replaceable component. The automated machine is programmed to move the replaceable component to the marking tool to place the distinguishing mark on the replaceable component. The automated machine may then move the replaceable component to a component removing device that can be used by the automated machine to extract the removable component from the automated machine. The distinguishing mark can be used by an operator to identify the automated machine that the replaceable component was extracted from.

Figure 1:
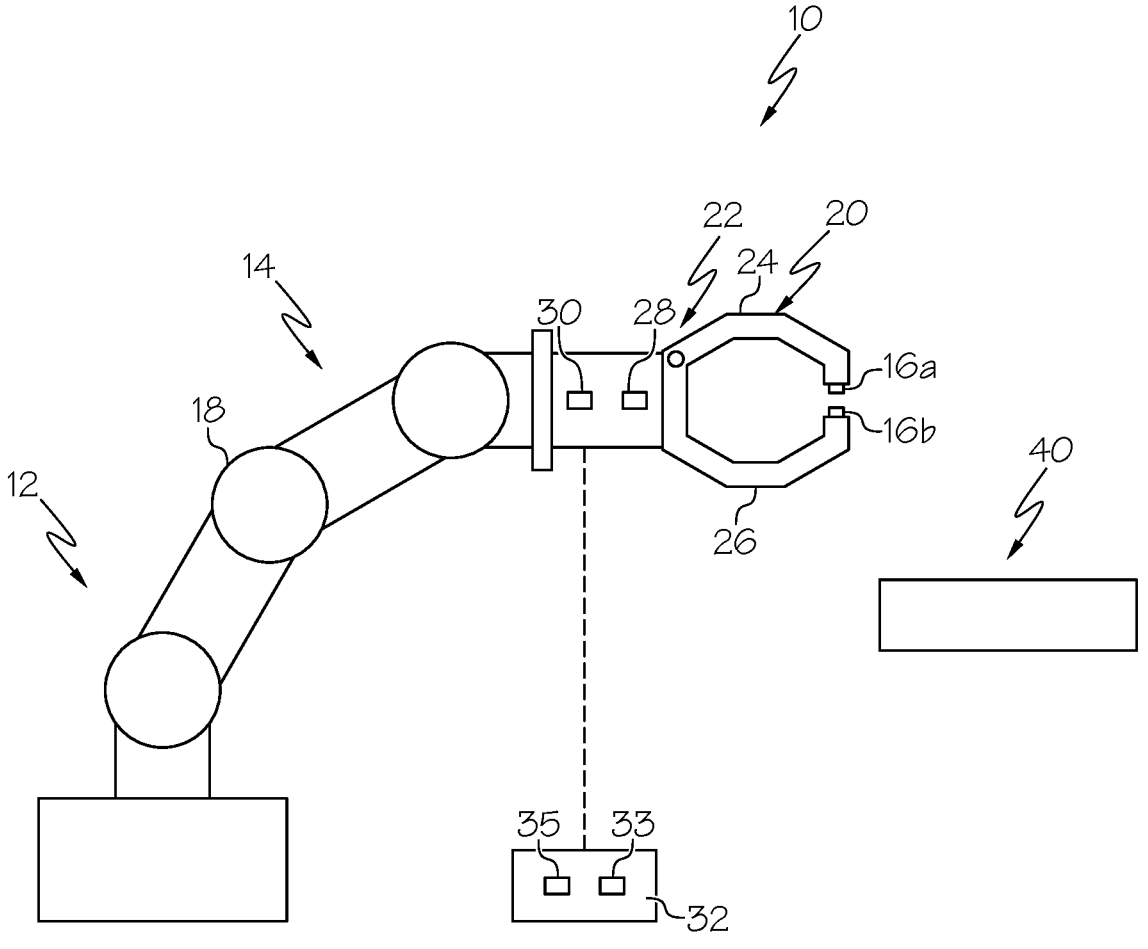
FIG. 1 illustrates a front view of an automated marking system, according to one or more embodiments shown and described herein.

Referring to FIG. 1, an automated marking system 10 includes an automated machine 12 including a robotic arm 14 with a replaceable component 16. In the illustrated example, the automated machine 12 is a welding robot that is configured for resistance spot welding and the replaceable component 16 is an electrode tip. As used herein, the term "robot" refers to a machine that is programmable to perform a series of actions automatically. It should be noted that while one robotic arm 14 is illustrated, the automated marking system 10 may be used with multiple robotic arms, such as two or more, four or more, eight or more 15 or more, 20 or more, etc. The robotic arm 14 may include a number of joints 18 that allow the robotic arm 14 to pivot, rotate and/or translate. At each joint 18, there may be a servo motor that moves the robotic arm 14 at the respective joint 18 and an encoder (i.e., a sensor) that can be used to detect an angle of the robotic arm 14.

The robotic arm 14 further includes a tool 20 that is located at an end 22 of the robotic arm 14. The tool 20 may be, for example, a resistance welding tool that includes a movable weld arm 24 and a stationary weld arm 26. Both the movable weld arm 24 and the stationary weld arm 26 include the replaceable component 16. The movable weld arm 24 can be pivoted or otherwise moved toward and away from the stationary weld arm 26 using a motor 28 and sensor 30 for a resistance welding operation. While a resistance welding operation is discussed herein, the tool 20 may be any removable component that is suitable for a particular operation, such as machining, picking, packing, etc.

A control system 32 may be part of or communicatively coupled to the robotic arm 14 for controlling movement of the motors and receive signals from the sensors. The control system 32 can acquire the signals from the sensors and control the various motors thereby moving the robotic arm 14 including the tool 20. The control system 32 may include one or more computers, processors 33, etc. that can be programmed using logic saved in memory 35 to perform any of the functions described herein.

Figure 4:
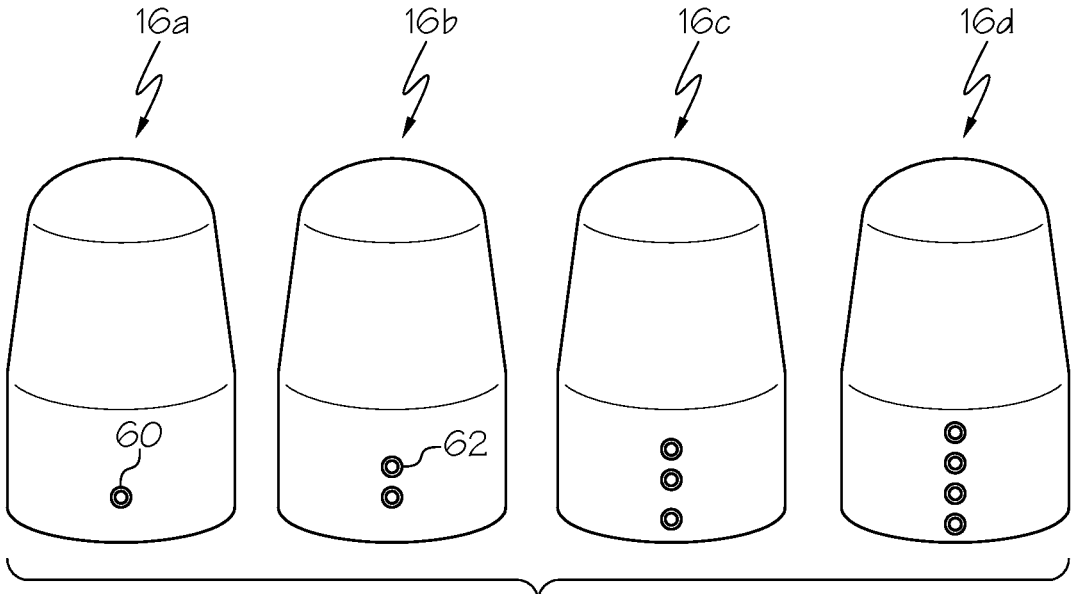
FIG. 4 illustrates electrode tips with distinguishing marks, according to one or more embodiments shown and described herein.

Referring briefly to FIG. 4, a number of electrode tips 16a, 16b, 16c and 16d are illustrated. The functionality of the electrode tips 16a, 16b, 16c and 16d may decrease over time due to use or because they are defective. As can be appreciated, when multiple robotic arms 14 are being used, it can be difficult and time-consuming to identify the robotic arm 14 a particular electrode tip 16 came from. This tracking of the electrode tips 16 may be useful where a particular robotic arm is operating incorrectly and needs to be diagnosed, for example, based on an observation of the particular electrode tip 16a, 16b, 16c and 16d or detecting an out-of-parameter condition.

Referring again to FIG. 1, to this end, a marking tool 40 is provided that can be used by the robotic arm 14 to place distinguishing marks on the electrode tips 16. The pattern of the distinguishing marks may be selected to not only identify a particular robotic arm 14, but also which of the moveable or stationary weld arms 24 and 26 the electrode tips 16 came from.

Figure 2:
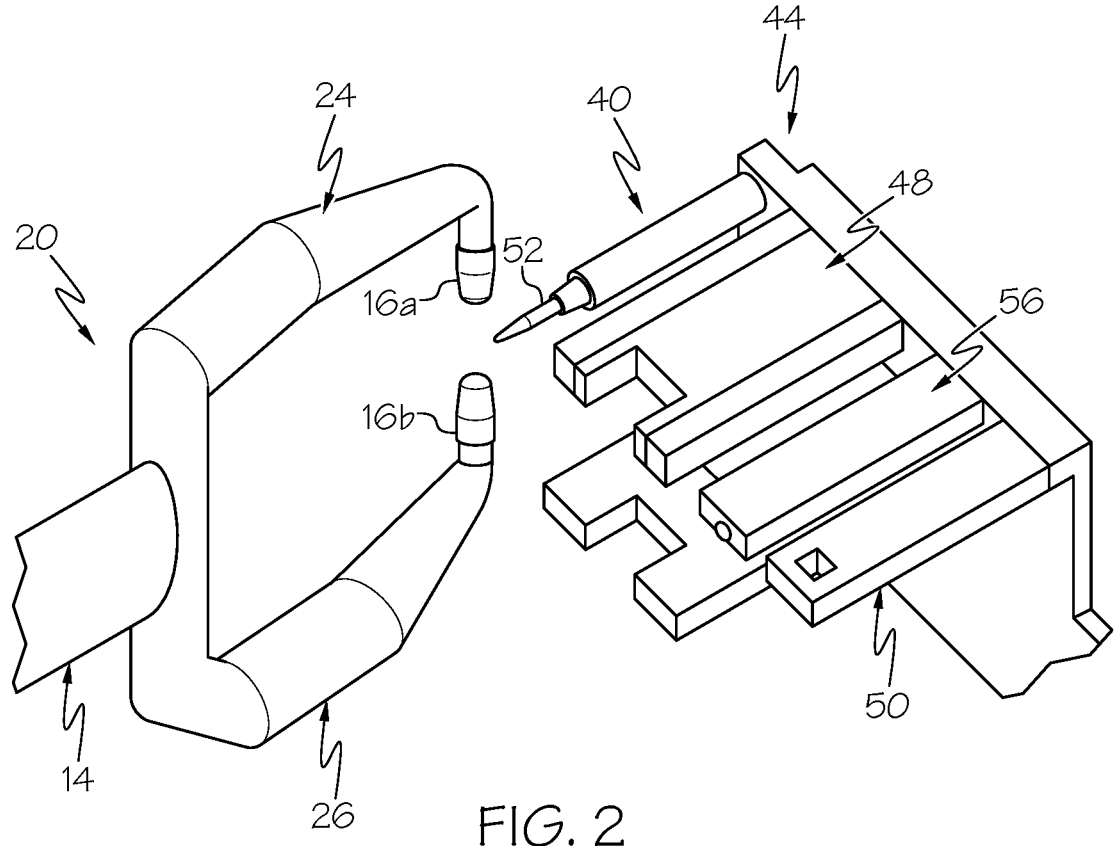
FIG. 2 is a diagrammatic view of a portion of a robot arm and a marking and extraction apparatus, according to one or more embodiments shown and described herein.

Referring now to FIG. 2, a marking and extraction apparatus 44 is illustrated that includes the marking tool 40, an extraction tool 48 and a tip supply device 50. The marking tool 40 may be mounted with the extraction tool 48 and includes a spring-loaded punch 52 or any other tool suitable for placing a distinguishing mark on the electrode tip 16. When the robotic arm 14 presses the electrode tip 16 against the spring-loaded punch 52, a mark is made on the electrode tip. The robotic arm 14 may be programmed to press the electrode tip 16 against the spring-loaded punch 52 a number of times that depends on the identity of the robotic arm 14 out of a number of robotic arms and which of the movable or stationary weld arms 24 and 26 the electrode tip 16 is located at. In the illustrated example, electrode tip 16a is located at an attachment location on the movable weld arm 24 and the electrode 16b is located at an attachment location on the stationary weld arm 26 of the particular robotic arm 14. Once the electrode tips 16a and 16b are distinguishingly marked, they may be removed from their weld arms 24 and 26 using the extraction tool 48. The extraction tool 48 may itself be any suitable commercially available extractor, such as those commercially available from Obara Corporation, Shinwa Co. Ltd. and Kyokutoh, Co. Ltd. Once the electrode tips 16 are removed and dropped into a bin, the empty movable and stationary weld arms 24 and 26 may be passed by a sensor 56 to detect that the electrode tips 16 are removed. The tool 20 may then be used to connect new electrode tips 16 to the movable and stationary weld arms 24 and 26 using the tip supply device 50. The new electrode tips 16 may be passed by the sensor 56, activating the sensor 56 and thereby detecting the presence of the electrode tips 16. At this point, another robotic arm may approach the marking and extraction apparatus 44 for another marking and extraction operation (e.g., corresponding to electrode tips 16c and 16d of FIG. 4).

The robotic arms 14 may mark and extract the electrode tips 16 based on any suitable criteria. For example, the electrode tips 16 may be marked and extracted based on a schedule, after a preselected period of time and/or on command by a person or automatically using a computing device. In some embodiments, an inspection system may be used to automatically inspect welds and provide an input to the control system 32 should extraction of the electrode tips

16 be needed. Such an inspection system may be part of the automated machine 12 or separate from the automated machine 12.

Figure 3:
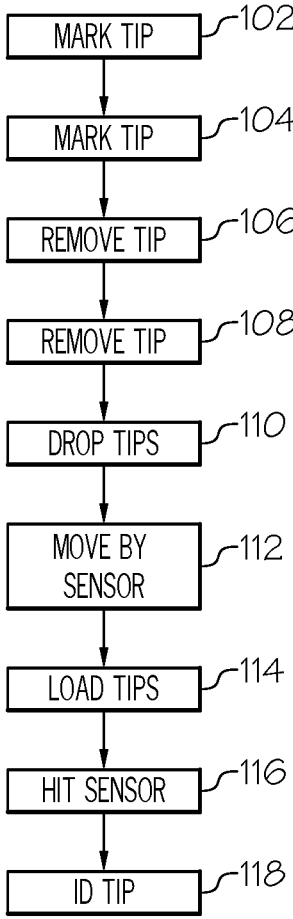
FIG. 3 illustrates a method for electrode tip tracking using the automated marking system of FIG. 1, according to one or more embodiments shown and described herein.

FIG. 3 illustrates a method for electrode tip tracking that includes moving the tool 20 with the electrode tips 16 to the marking and extraction apparatus 44. At step 102, the electrode tip 16a of the movable weld arm 24 is brought into contact with the marking tool 40 and pressed against the marking tool 40 until a distinguishing mark is made. Referring also to FIG. 4, assuming the robotic arm 14 has the lowest robot identification number of all of the robotic arms, the electrode tip 16a of the movable weld arm 24 may receive the lowest number of marks 60 (e.g., one), as an example. At step 104, the electrode tip 16b of the stationary weld arm 26 is brought into contact with the marking tool 40 and pressed against the marking tool 40 until another distinguishing mark 62 is made. The electrode tip 16b of the stationary weld arm 26 may receive a different number of marks 62 (e.g., two).

The robotic arm 14 may then move the tool 20 with the marked electrodes 16a and 16b to the extraction tool 48. The robotic arm 14 may use the extraction tool 48 to remove the electrode tip 16a of the movable weld arm 24 at step 106 and then remove the electrode tip 16b of the stationary weld arm 26 at step 108. The electrode tips 16a and 16b may then fall into a bin with other electrode tips at step 110 and represented by FIG. 4. At step 112, the empty tool 20 may move by the sensor 56 to detect that the electrode tips 16a and 16b are removed. The robotic arm 14 may then move the tool 20 to the tip supply device 50 to connect new electrode tips at step 114. The new electrode tips can be detected using the sensor 56 at step 116. At step 118 and referring to FIG. 4, an operator that accesses the electrode tips 14a, 14b, 14c and 14d can then identify the robotic arm 14 based on the distinguishing marks 60 and 62 and also which of the movable weld arm 24 and the stationary weld arm 26 each electrode tip 16a and 16b originated. In some embodiments, a look-up table or other method may be used to associate the number of marks with particular robot identification numbers. The look-up table may be a report and/or saved in memory of a computing device to perform the identification process automatically and provide results.

The above-described automated marking systems and methods for replaceable automated machine component tracking allows a user to identify a robotic arm from which a replaceable component originated. The robot identification number and position of the replaceable component on the robotic arm can be used to determine what distinguishing mark to use. For example, the robotic arm with lowest robot identification number may have the least overall marks and the movable weld arm of the same robotic arm may have less marks than the stationary weld arm.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automated marking system for replaceable component tracking, comprising:
   a robotic arm;
   a spring-loaded punch configured to place a distinguishing mark on a first replaceable component and a second replaceable component of the robotic arm; and
   a control system comprising logic saved in memory that causes the robotic arm to move the replaceable component to the spring-loaded punch to place the distinguishing mark on the first replaceable component and the second replaceable component;
   wherein the control system is configured to cause the robotic arm to contact the first replaceable component against the spring-loaded punch a different number of times than the second replaceable component based on the locations of the first and second replaceable components to provide the second replaceable component with a different distinguishing mark than the distinguishing mark of the first replaceable component.

2. The automated marking system of claim 1, wherein the robotic arm comprising a welding tool comprising attachments for the first replaceable component and a second replaceable component.

3. The automated marking system of claim 2, wherein the first replaceable component comprises a first electrode tip and the second replaceable component comprises a second electrode tip.

4. The automated marking system of claim 3, wherein the welding tool comprises a movable weld arm that connects to the first electrode tip and a stationary weld arm that connects to the second electrode tip.

5. The automated marking system of claim 2, wherein the distinguishing mark of the first removable component is a first array of dots having a first number of dots and the different distinguishing mark of the second removable component is a second array of dots having a second number of dots different from the first number of dots.

6. A method of automatically marking a removable component of a robotic arm for tracking the removable component back to the robotic arm, the method comprising:
   the robotic arm moving a first removable component to a spring-loaded punch and contacting the first removable component against the spring-loaded punch a first number of times providing a first distinguishing mark;
   the robotic arm using an extraction tool to remove the first removable component after providing the distinguishing mark; and
   the robotic arm moving a second removable component to the spring-loaded punch and contacting the second removable component against the spring-loaded punch a second number of times that is different than the first number of times providing a second distinguishing mark that is different from the first distinguishing mark based on the locations of the first and second replaceable components.

7. The method of claim 6, wherein the first replaceable component comprises a first electrode tip and the second replaceable component comprises a second electrode tip.

8. The method of claim 7, wherein the welding tool comprises a movable weld arm that connects to the first electrode tip and a stationary weld arm that connects to the second electrode tip.

9. The method of claim 6 further comprising the robotic arm using the extraction tool to remove the second removable component after contacting the second removable component against the marking tool providing the second distinguishing mark.

10. The method of claim 9 further comprising using the first and second distinguishing marks for tracking the first and second removable components back to the robotic arm after the first and second removable components are removed.

11. The method automated marking system of claim 6, wherein the first distinguishing mark comprises a first number of dots and the second distinguishing mark comprises a second number of dots different than the first number of dots.

\* \* \* \* \*